(12) United States Patent
Anand et al.

(10) Patent No.: US 12,321,701 B2
(45) Date of Patent: Jun. 3, 2025

(54) BUILDING AND USING TARGET-BASED SENTIMENT MODELS

(71) Applicant: Microsoft Technology Licensing, LLC, Redmond, WA (US)

(72) Inventors: Vishal Anand, Redmond, WA (US); Ananya Mishra, Seattle, WA (US); Pramodith Ballapuram, Dublin (IE); Cheng Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 17/981,293

(22) Filed: Nov. 4, 2022

(65) Prior Publication Data

US 2024/0152696 A1    May 9, 2024

(51) Int. Cl.
*G06F 40/284* (2020.01)
*G06F 40/56* (2020.01)
(Continued)

(52) U.S. Cl.
CPC ............ *G06F 40/284* (2020.01); *G06F 40/56* (2020.01); *G06Q 30/0203* (2013.01); *G06Q 30/0282* (2013.01)

(58) Field of Classification Search
CPC ...... G06F 40/284; G06F 40/56; G06F 40/289; G06F 40/30; G06Q 30/0203;
(Continued)

(56) References Cited

U.S. PATENT DOCUMENTS 8,554,701 B1 * 10/2013 Dillard .................. G06F 40/30
706/12
9,672,555 B1 * 6/2017 Dillard .................. G06F 16/35
(Continued)

FOREIGN PATENT DOCUMENTS

CN         112883144 A    6/2021
CN         114491077 A    5/2022

OTHER PUBLICATIONS

International Search Report and Written Opinion received for PCT Application No. PCT/US23/033669, Jan. 22, 2024, 16 pages.
(Continued)

*Primary Examiner* — Thuykhanh Le
(74) *Attorney, Agent, or Firm* — Ray Quinney & Nebeker; James Bullough

(57) ABSTRACT

Systems and methods are directed to training and utilizing a generative language model that is constrained by a predetermined template that is used to train the generative language model. Once trained, customer data is accessed and transmitted to an evaluation component associated with the generative language model. The generative language model generates one or more sentences based on a feedback input of the plurality of feedback inputs, whereby the one or more sentences each include a sentiment, a target, and a reason for the sentiment in a format defined by the predetermined template. The evaluation component then identifies the sentiment, the target, and the reason from a sentence of the one or more sentences. A communication is then presented, on a device of a user, based on at least the sentiment and the reason identified from the sentence. The communication can be an alert or a report.

18 Claims, 8 Drawing Sheets

| 402 FEEDBACK | 404 RESULT |
|---|---|
| I HAD EXTREME DIFFICULTY CONTACTING THE RIGHT PERSON FOR MY ISSUE. HOWEVER, WHEN I FINALLY MADE CONTACT, THE SUPPORT REPRESENTATIVE DID A GREAT JOB IN GETTING MY ISSUE RESOLVED. | THE CUSTOMER IS SAD ABOUT THE COMMUNICATION MEANS BECAUSE THEY HAD EXTREME DIFFICULTY CONTACTING THE RIGHT PERSON. . THE CUSTOMER IS HAPPY ABOUT THE SUPPORT REPRESENTATIE BECAUSE THEY DID A GREAT JOB IN GETTING THE ISSUE RESOLVED. |

| 406 SENTIMENT | 408 TARGET | 410 REASON |
|---|---|---|
| SAD | COMMUNICATIONS MEANS | THEY HAD EXTREME DIFFICULTY CONTACTING THE RIGHT PERSON |
| HAPPY | SUPPORT REPRESENTATIVE | THEY DID A GREAT JOB IN GETTING THE ISSUE RESOLVED |

(51) Int. Cl.
　　　*G06Q 30/0203*　　　(2023.01)
　　　*G06Q 30/0282*　　　(2023.01)
(58) Field of Classification Search
　　　CPC .. G06Q 30/0282; G06Q 10/04; G06Q 10/067;
　　　　　　　　　　　　　　G06Q 30/01; G06Q 30/0202
　　　USPC .......................................................... 704/9
　　　See application file for complete search history.

(56) References Cited

U.S. PATENT DOCUMENTS

| | | | | |
|---|---|---|---|---|
| 10,831,990 | B1* | 11/2020 | Tater | G06F 40/226 |
| 10,896,428 | B1* | 1/2021 | Balasubramaniam | |
| | | | | G10L 15/1815 |
| 11,200,581 | B2 | 12/2021 | Williams et al. | |
| 11,843,719 | B1* | 12/2023 | Liu | H04L 67/60 |
| 2006/0248118 | A1* | 11/2006 | Curtis | H04L 43/0817 |
| 2007/0112947 | A1* | 5/2007 | Anderson | H04L 41/5074 |
| | | | | 709/223 |
| 2008/0133488 | A1* | 6/2008 | Bandaru | G06F 40/30 |
| | | | | 715/810 |
| 2009/0157903 | A1* | 6/2009 | Lewis | H04L 41/5074 |
| | | | | 709/246 |
| 2009/0265307 | A1* | 10/2009 | Reisman | G06F 16/345 |
| 2009/0276728 | A1* | 11/2009 | Doan | G06Q 10/10 |
| | | | | 715/764 |
| 2011/0153390 | A1* | 6/2011 | Harris | G06Q 30/02 |
| | | | | 705/7.33 |
| 2012/0023044 | A1* | 1/2012 | Anerousis | G06N 5/043 |
| | | | | 706/46 |
| 2013/0073336 | A1* | 3/2013 | Heath | G06Q 30/02 |
| | | | | 705/7.29 |
| 2014/0140497 | A1* | 5/2014 | Ripa | H04M 3/5175 |
| | | | | 379/265.06 |
| 2015/0106704 | A1* | 4/2015 | Towle | G09B 7/04 |
| | | | | 715/271 |
| 2015/0281445 | A1* | 10/2015 | Kumar | H04M 3/5175 |
| | | | | 379/88.01 |
| 2015/0358292 | A1* | 12/2015 | Karale | H04L 63/0263 |
| | | | | 726/11 |
| 2016/0021334 | A1* | 1/2016 | Rossano | G10L 13/033 |
| | | | | 704/2 |
| 2017/0300990 | A1* | 10/2017 | Tanaka | G10L 15/08 |
| 2018/0108022 | A1* | 4/2018 | Bandera | G06Q 10/06316 |
| 2018/0124243 | A1* | 5/2018 | Zimmerman | H04M 3/5133 |
| 2018/0189270 | A1* | 7/2018 | Chakraborty | G06F 40/30 |
| 2018/0203754 | A1* | 7/2018 | Beohar | G06F 40/30 |
| 2018/0218430 | A1 | 8/2018 | Prendki | |
| 2019/0294668 | A1* | 9/2019 | Goel | H04N 21/4788 |
| 2020/0035244 | A1* | 1/2020 | Kim | G06F 40/30 |
| 2020/0258013 | A1* | 8/2020 | Monnett | H04L 41/5074 |
| 2020/0265115 | A1* | 8/2020 | Hinrichs | G06F 16/353 |
| 2020/0279017 | A1* | 9/2020 | Norton | G06N 3/045 |
| 2020/0320381 | A1* | 10/2020 | Venkatraman | G06Q 10/067 |
| 2020/0356633 | A1* | 11/2020 | Garlapati | G06F 16/287 |
| 2020/0410450 | A1* | 12/2020 | Malhotra | G06F 40/284 |
| 2021/0004706 | A1* | 1/2021 | Riddle | G06F 40/30 |
| 2021/0334472 | A1* | 10/2021 | Shah | G06F 40/30 |
| 2021/0374671 | A1* | 12/2021 | Li | G10L 15/26 |
| 2022/0166879 | A1 | 5/2022 | Mackie | |
| 2023/0113860 | A1* | 4/2023 | ML | H04L 41/069 |
| | | | | 370/252 |
| 2023/0161944 | A1* | 5/2023 | Sharma | G06F 40/109 |
| | | | | 715/269 |
| 2023/0162261 | A1* | 5/2023 | Taylor | G06F 40/30 |
| | | | | 705/26.7 |
| 2023/0206287 | A1* | 6/2023 | Sethuraman | G06Q 30/0282 |
| | | | | 705/347 |
| 2024/0264895 | A1* | 8/2024 | Ranjan | G06F 11/07 |

OTHER PUBLICATIONS

Varia et al.,"Instruction Tuning for Few-Shot Aspect-Based Sentiment Analysis," arxiv.org, Cornell University Library, 8 Pages, Oct. 12, 2022.

Zhang et al., "Aspect Sentiment Quad Prediction as Paraphrase Generation," arxiv.org, Cornell University Library, 11 Pages, Oct. 2, 2021.

"Nlpaug", Retrieved from: https://nlpaug.readthedocs.io/en/latest/, Retrieved Date: Oct. 17, 2022, 2 Pages.

"Presidio: Data Protection and Anonymization SDK", Retrieved from: https://microsoft.github.io/presidio/, Retrieved Date: Oct. 17, 2022, 3 Pages.

"Silicone", Retrieved from: https://huggingface.co/datasets/silicone, Retrieved Date: Oct. 17, 2022, 12 Pages.

"What is ONNX—Open Neural Network Exchange", Retrieved From: https://microsoft.github.io/ai-at-edge/docs/onnx/, Dec. 10, 2019, 4 Pages.

Casale, Michael, "Featurizing text with Google's T5 text to text transformer", Retrieved from: https://blog.ccganalytics.com/featurizing-text-with-googles-t5-text-to-text-transformer, Mar. 29, 2021, 14 Pages.

Danka, Tivadar, "How to accelerate and compress neural networks with quantization", Retrieved from: https://towardsdatascience.com/how-to-accelerate-and-compress-neural-networks-with-quantization-edfbbabb6af7, Jun. 29, 2020, 12 Pages.

Jain, et al., "SpSAN: Sparse self-attentive network-based aspect-aware model for sentiment analysis", In Journal of Ambient Intelligence and Humanized Computing, Aug. 21, 2021, 18 Pages.

Luo, et al., "Make Templates Smarter: A Template Based Data2Text System Powered by Text Stitch Model", In Proceedings of of the Association for Computational Linguistics, Nov. 2020, pp. 1057-1062.

Pei, et al., "Targeted Sentiment Analysis: A Data-Driven Categorization", In repository of arxiv code:1905.03423v1 [cs.CL], May 9, 2019, 7 Pages.

Raffel, et al., "Exploring the Limits of Transfer Learning with a Unified Text-to-Text Transformer", In repository of arxiv code: 1910.10683v3 [cs.LG], Jul. 28, 2020, 67 Pages.

Zhang, "Bertscore: Evaluating Text Generation With Bert", In repository of arxiv code:1904.09675v3 [cs.CL], Feb. 24, 2020, 43 Pages.

"The HaTS—Happiness Tracking Survey", Retrieved from: https://medium.com/@prasanta.mohanty/the-hats-happiness-tracking-survey-c3b45087cba4, Aug. 12, 2021, 7 Pages.

"Microsoft Learn. Spark possibility", Retrieved from: https://learn.microsoft.com/en-us/, Retrieved Date: Oct. 20, 2022, 4 Pages.

* cited by examiner

| SAMPLE INPUT | I WAS CALLED AT AN INAPPROPRIATE TIME OF 7:30AM IN THE MORNING JUST TO CLOSE THE TICKET WITHOUT GIVING A SATIFACTORY SOLUTION |
|---|---|
| ANNOTATIONS | THE CUSTOMER IS <SAD> ABOUT <THE COMMUNICATION MEANS> BECAUSE <THEY WERE CALLED AT AN INAPPROPRIATE TIME OF 7:30AM IN THE MORNING>. |
| | THE CUSTOMER IS <SAD> ABOUT <THE CUSTOMER SERVICE> BECAUSE <THE TICKET WAS CLOSED WITHOUT A SATISFACTORY SOLUTION>. |

FIG. 3A

| SAMPLE INPUT | THE AGENT WAS GREAT AT UNDERSTANDING THE ISSUE, BUT HE WAS UNBLE TO SOLVE MY EMAIL BOUNCE-BACK ISSUE. I HAVE THIS ISSUE EVERY TIME I SET AN OUT-OF-OFFICE NOTIFICATION. |
|---|---|
| ANNOTATIONS | THE CUSTOMER IS <HAPPY> ABOUT <THE AGENT> BECAUSE <HE UNDERSTANDS THE ISSUE>. |
| | THE CUSTOMER IS <SAD> ABOUT <THE AGENT> BECAUSE <HE COULD NOT SOLVE THE ISSUE>. |
| | THE CUSTOMER IS <SAD> ABOUT <THE PRODUCT> BECAUSE <THERE IS AN EMAIL BOUNCE-BACK ISSUE EVERY TIME AN OUT-OF-OFFICE NOTIFICATION IS SET>. |

FIG. 3B

BUILDING AND USING TARGET-BASED SENTIMENT MODELS

TECHNICAL FIELD

The subject matter disclosed herein generally relates to machine learning models. Specifically, the present disclosure addresses systems and methods that train a generative language model that is constrained by a target-based sentiment template and utilizes the trained model to analyze future data.

BACKGROUND

Traditional sentiment analysis models typically output sentiment of an entire document. These results miss a lot of details and nuances within the document. Furthermore, conventional systems use classification techniques to train a model for a specific set of features. Thus, these conventional models can only optimize for the features that the models have been trained for. When new features need to be considered by the model, the model needs to be retrained with new data classified to consider the new features. This process can be inefficient and resource consuming.

BRIEF DESCRIPTION OF THE DRAWINGS

Some embodiments are illustrated by way of example and not limitation in the figures of the accompanying drawings.

FIG. 3A is a diagram illustrating annotations of a first sample input, according to one example.

FIG. 3B is a diagram illustrating annotations of a second sample input, according to one example.

DETAILED DESCRIPTION

Figure 1:
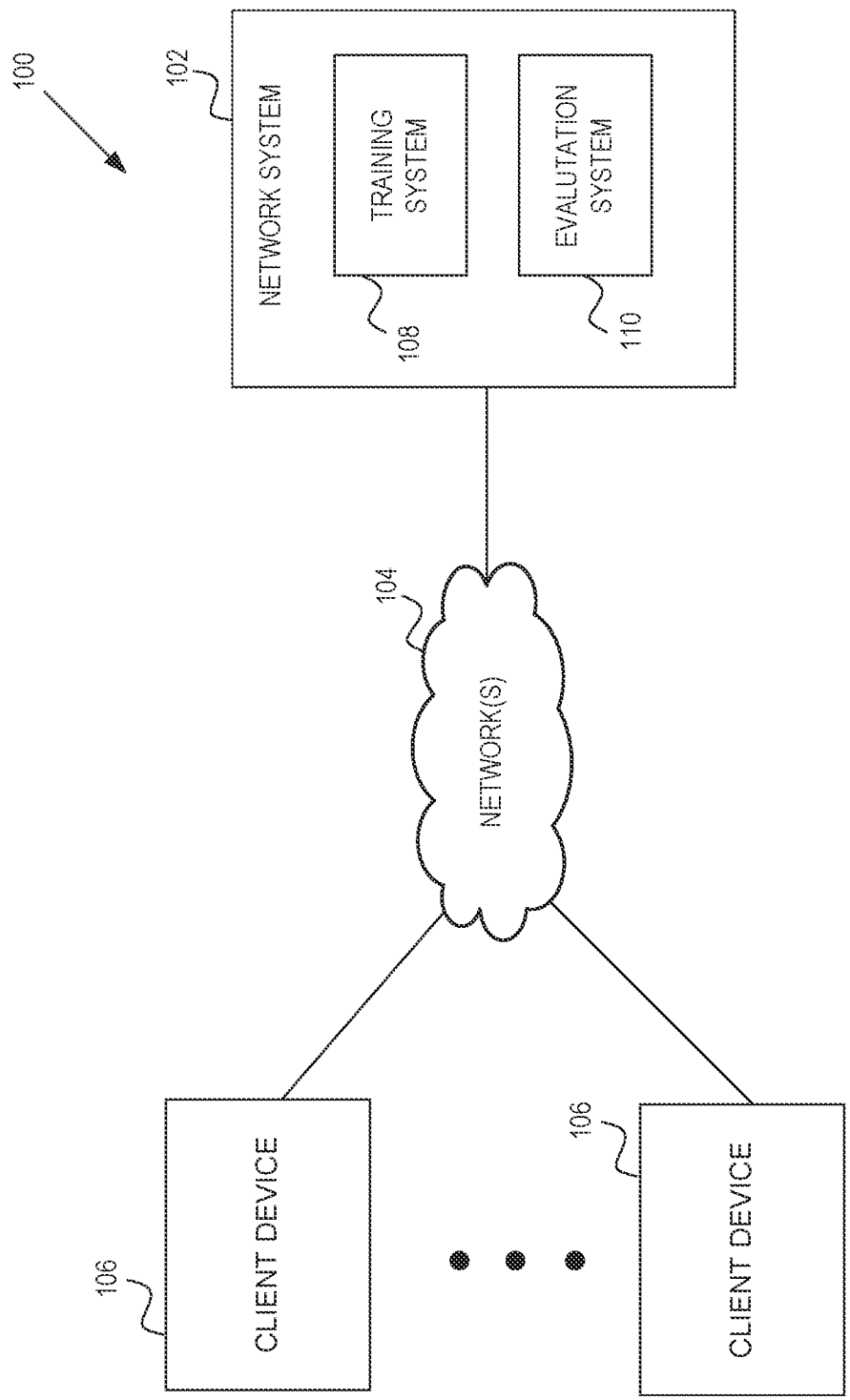
FIG. 1 is a diagram illustrating a network environment suitable for building and using a target-based sentiment model that is generative, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Machine learning is an application that provides computer systems the ability to perform tasks, without explicitly being programmed, by making inferences based on patterns found by analyzing data. Thus, machine learning learns from existing data and make predictions about new data. Machine-learning algorithms operate by building a machine learning model from example training data in order to make data-driven predictions or decisions expressed as outputs.

There are several common modes for machine learning including supervised machine learning and unsupervised machine learning. Supervised machine learning uses prior knowledge (e.g., examples that correlate inputs to outputs) to learn the relationships between the inputs and the outputs. The goal of supervised machine learning is to learn a function that, given some training data, best approximates a relationship between the training inputs and outputs so that the machine learning model can implement the same relationships when given new inputs to generate corresponding outputs. Supervised machine learning is commonly used to classify items into one of several category values (e.g., sentiments such as, positive or negative). Some examples of commonly used supervised machine learning algorithms include Logistic Regression (LR), Naïve-Bayes, Random Forest (RF), neural networks (NN), deep neural networks (DNN), matrix factorization, and Support Vector Machines (SVM).

Unsupervised machine learning is the training of a machine learning algorithm using information that is neither classified nor labeled and allowing the algorithm to act on that information without guidance. Unsupervised machine learning is useful in exploratory analysis because it can automatically identify structure in data. Some common tasks for unsupervised ML include clustering and representation learning. Some examples of commonly used unsupervised-ML algorithms are K-means clustering, principal component analysis, and autoencoders.

As discussed, conventional sentiment analysis models output sentiment of an entire document (e.g., an email, a survey), which can result in nuances being missed. For instance, a four-star review may be classified as positive feedback. However, the review may indicate that while the issue was resolved (e.g., positive feedback), an agent handling a service call was rude (e.g., negative feedback). Here, the negative feedback is typically not identified by the conventional sentiment analysis model. For customer satisfaction survey data, it is important to identify a sentiment (e.g., a customer is happy or sad), a target (e.g., what is the sentiment directed towards), and a reason (e.g., why does the customer feel that way).

Example embodiments address the technical problem of generating and using a target-based sentiment model that is capable of identifying features that it was not explicitly trained to identify. Specifically, the target-based sentiment model is a generative language model that is trained to generate outputs that follow a predetermined template with which it was trained but that can include features (e.g., targets, sentiments, reasons) that it was not explicitly trained with. As such, example embodiments can look for any observable feature (e.g., sentiment, target) and attempt to extract a human or human-simulated explanation (e.g., reason) without need for explicit updates or retraining of the model. As such, one or more of the methodologies described herein may obviate a need for certain efforts or computing resources that otherwise would be involved in repeatedly retraining models. Examples of such computing resources include processor cycles, network traffic, memory usage, data storage capacity, power consumption, network bandwidth, and cooling capacity.

FIG. 1 is a diagram illustrating a network environment 100 suitable for building and using target-based sentiment models that are generative, in accordance with example embodiments. A network system 102 is communicatively coupled, via a network 104, to a plurality of client devices 106. In some embodiments, the network system 102 is associated with a single entity (e.g., a software-as-a-service (SaaS) provider). The network system 102 comprises a training system 108 and an evaluation system 110.

The training system 108 is configured to build (e.g., generate, train) the generative language model. In example embodiments, the generative language model (or just "generative model") is a target-based sentiment model that is trained on a small training data set and that is constrained by a predetermined template. Specifically, the generative language model is trained to look for similar text patterns as the training data set and generate outputs (e.g., sentences) that are in a same format as the predetermined template used in training. In one embodiment, the predetermined template is a target-based sentiment template that constrains an output to a format of "The customer is <sentiment> about <target> because <reason>." The training system 108 will be discussed in more detail in connection with FIG. 2 and FIG. 3 below.

In example embodiments, the evaluation system 110 is configured to evaluate new feedback inputs (e.g., customer satisfaction data) using the target-based sentiment model (also referred to herein as "sentiment model"). Specifically, the new feedback inputs are applied to the sentiment model, which evaluates the feedback inputs to generate outputs (e.g., one or more sentences) that satisfy the format of the target-base sentiment template (also referred to herein as "sentiment template"). In some embodiments, the outputs are parsed to identify the sentiment, the target, and the reason for the sentiment for various feedback inputs. Feedback inputs that cannot be evaluated into an output format that satisfies the sentiment template are considered to be neutral in sentiment. The evaluation system 110 will be discussed in more detail in connection with FIG. 2 and FIG. 4 below.

Each client device 106 is a device of a user of the network system 102. The client devices 106 may comprise, but are not limited to, a smartphone, tablet, laptop, multi-processor systems, microprocessor-based or programmable consumer electronics, game consoles, set-top boxes, a server, or any other communication device that can perform operations with respect to the network system 102 via the network 104. The operations can include, for example, generating or providing feedback inputs via emails and surveys (collectively referred to herein as "customer satisfaction data"). In these cases, the client device 106 is a device of a customer of an entity that is using the services of the network system 102 to analyze their customer satisfaction data.

The operations can also include receiving annotations of input data for training the sentiment model. In these cases, the client device 106 is a device of a user associated with the network system 102 (e.g., an employee of an entity that owns the network system 102) that accesses and annotates (e.g., labels) the input data for training.

In some cases, the client device 106 is associated with an owner (or their agent) of the customer satisfaction data with permission to access analyzed outputs or alerts produced by the network system 102. For example, the owner of the customer satisfaction data can be a client of the network system 102 that is using the services of the network system 102. In these cases, the customer satisfaction data can be customer feedback/reviews of services or products provided by the client, and the analyzed outputs can be analysis of the customer feedback/reviews (e.g., analysis of customer sentiment to determine what aspects need improvement). In some cases, customer service agents associated with the owner can search for recommended actions or be presented with these recommended actions, via their client devices 106, when they encounter a customer that has an issue. In some cases, alerts or reports can be provided to client devices 106 of managers or quality leads that provide insight based on the analyzed output, which can allow the managers or quality leads to provide corrective actions to the customer support agents they supervise.

Depending on the form of the client devices 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated In example embodiments, any of the systems and devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 8, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of client devices 106 may be embodied within the network environment 100. While only a single network system 102 is shown, alternative embodiments contemplate having more than one network system 102 to perform the operations discussed herein (e.g., each localized to a particular region).

Figure 2:
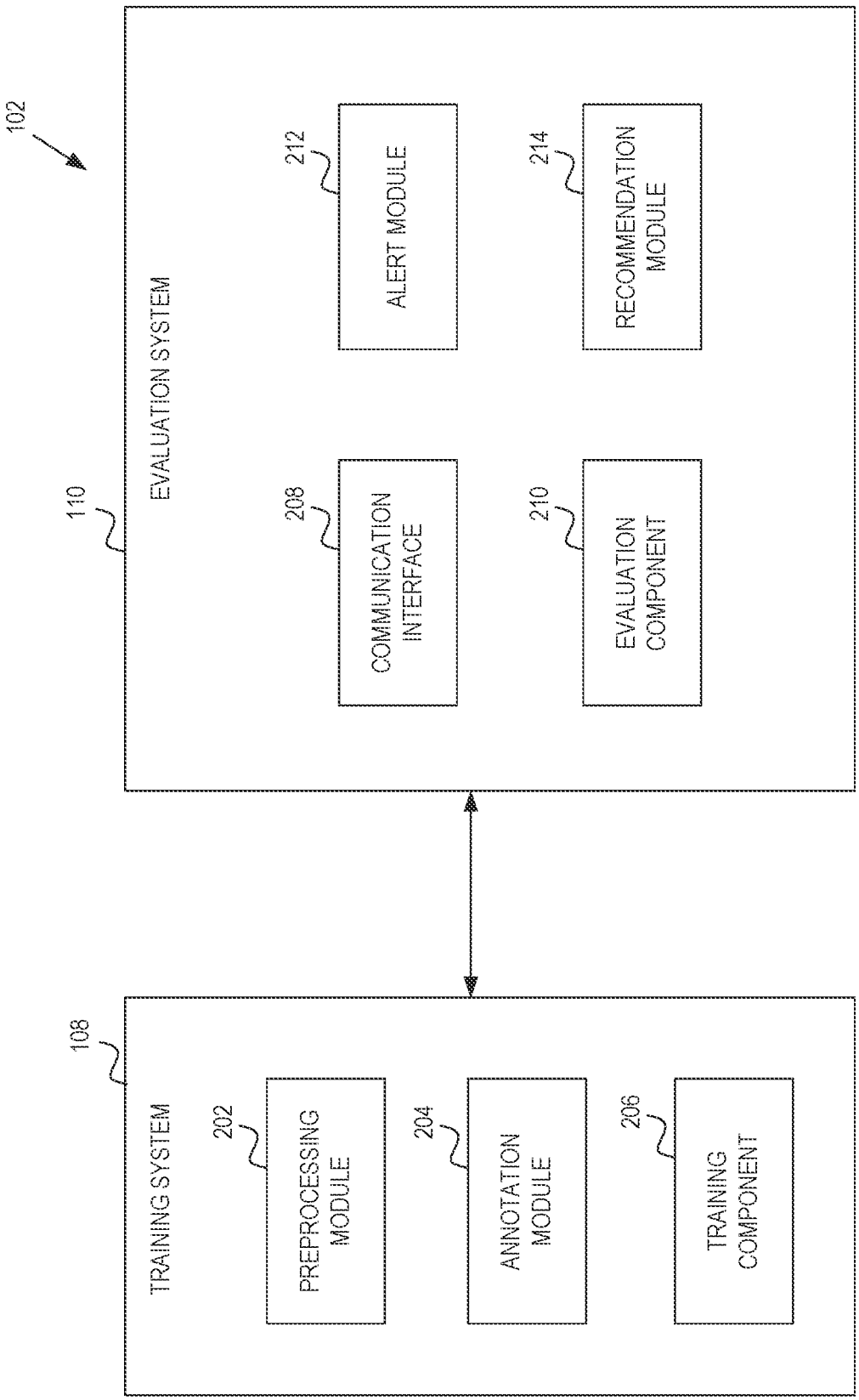
FIG. 2 is a diagram illustrating components of the network system, according to some example embodiments.

FIG. 2 is a diagram illustrating components of the network system 102, according to some example embodiments. The network system 102 comprises the training system 108 and the evaluation system 110 communicative coupled together (e.g., via a network). In example embodiments, the training system 108 is configured to build the generative model that is constrained by the predetermined template. To enable this operation, the training system 108 comprises a preprocessing module 202, an annotation module 204, and a training component 206.

The preprocessing module 202 is configured to preprocess training data prior to using it for training the generative model. In some embodiments, the training data may be anonymized. For instance, personally identifiable information (PII) may be scrubbed from the training data by the preprocessing module 202. Additionally, the preprocessing module 202 removes special characters and punctuations other than periods. The preprocessing may occur prior to an annotation or labeling process.

The training data includes a plurality of feedback input. In one embodiment, each feedback input can be a statement from an email or a survey that is received from a customer in response to customer service being provided to the customer. Specifically, the feedback input includes sample statements or inputs regarding the customer's sentiment towards a target. For example and referring to FIG. 3A, a sample input is "I was called at an inappropriate time of 7:30 am in the morning just to close the ticket without giving a satisfactory solution." This sample input may be associated with a low star rating (e.g., one-star) or other type of negative scoring. As another example and referring to FIG. 3B, a sample input is "The agent was great at understanding the issue, but he was unable to solve an email bounce-back issue. I have this issue every time I set an out-of-office notification." This sample input may be associated with a mid-range star rating (e.g., three star or four star) or other type of similar scoring.

The annotation module 204 is configured to manage annotations of the training data. In some embodiments, the training data can be reviewed and annotated by a human user (e.g., via the client device 106). In some embodiments, the training data can be reviewed and annotated by a machine (e.g., a machine learning model) that has been trained to annotate training data. Further still, a combination of both humans and machines can perform the annotations.

In one embodiment, the annotation or labeling may be in a template format of "The customer is <sentiment> about <target> because <reason>. Referring to the example of FIG. 3A, the sample input results two annotations. A first annotation is that the customer is <sad> about < the communication means> because < they were called at an inappropriate time of 7:30 am in the morning>. Thus, the training data indicates that the sentiment is "sad," the target is "communication means," and the reason is "was called at an inappropriate time of 7:30 am in the morning." A second annotation is that the customer is <sad> about < the customer service> because < the ticket was closed without a satisfactory solution>. Here, the sentiment is "sad," the target is "customer service," and the reason is "the ticket was closed without a satisfactory solution." Thus, the annotated training data indicates the template format in which the generative model should be trained to provide an output and text patterns to detect for when analyzing new data.

Referring to the example of FIG. 3B, a sample input results in three annotations. This sample input has both positive and negative feedback. A first annotation is that the customer is <happy> about < the agent> because <he understands the issue>. Thus, the training data indicates that the sentiment is "happy," the target is "the agent," and the reason is "he understands the issue." A second annotation is that the customer is <sad> about < the agent> because <he could not solve the issue>. Here, the sentiment is "sad," the target is "the agent," and the reason is "he could not solve the issue." Thus, in this example, there is both a positive sentiment and a negative sentiment with the same target. A final annotation is that the customer is <sad> about < the product> because <there is an email bounce-back issue every time an out-of-office notification is set>. Here, the sentiment is "sad," the target is "the product," and the reason is "there is an email bounce-back issue every time an out-of-office notification is set."

Once annotated, the training data is provided to the training component 206 to train the generative model. The training data includes each original sample input and the corresponding annotations in the template format. In example embodiments, the model is trained to perform natural language generation tasks (e.g., language modeling tasks). This is in contrast to convention models which may be trained to perform token/sequence classification tasks or classification tasks. In token/sequence classification tasks, each token is fed as an input as either belonging to a target or a reason and a sentiment model run on top of that. In classification tasks, the model is typically trained based on a fixed set of targets or reasons. Thus, both types of conventional models suffer from the disadvantage of being constrained to the targets or reasons that they have been trained with. If there are new targets (e.g., new products), for example, these conventional models need to be retrained immediately with training data including the new targets in order to maintain their performance level.

In example embodiments, the model generated by the training component 206 is a generative model. Because the model is generative in nature, the model allows for unlimited sets of targets and reasons, even if the model has never seen (e.g., via the training data) the targets or reasons before, and the training does not require a pre-defined list of the targets or reasons. Thus, for example, when there is a new target, the generative model does not need to be retrained or retrained as frequently as conventional models. For instance, assume that the generative model is trained with feedback indicating "Company ABC does a great job with customer support," (e.g., annotation is "The customer is <happy> about <Company ABC> because <does a great job with customer support>"). If the generative model is later provided feedback "Company XYZ is excellent providing data privacy,"

the generative model can generate an output of "The customer is <happy> about <Company XYZ> because < is excellent in providing data privacy>," even though the generative model was never trained with "Company XYZ" as a target or "is excellent in providing data privacy" as a reason.

A further advantage of the generative model is that it supports implicit targets. Thus, when feedback indicates a target that is not explicit regarding the issue, the generative model is able to generate a target because it is generative in nature. This is true even if the generative model has never seen the target in the training data. As long as the generative model has an inherent understanding of language, the generative model can generate meaningful targets. For instance, when given feedback "I was called during dinner time merely to acknowledge that my ticket was opened," the generative model determines that the implicit target is "communications means" even though those words were not in the feedback.

In example embodiments, the training component 206 makes use of a text-to-text-transfer-transformation (T5) model. The training component 206 leverages the T5 model's innate understanding of language (e.g., syntactical representations, semantic context) it gains from being pre-trained when treating the training as a language modeling task. The T5 model is used due to its good few shot learning capabilities. With just a few examples in the training data (e.g., 50-100 sample inputs), good performance by the generative model is achieved.

Additionally, the T5 model supports multi-task training. That is, the same model with same parameters can be used for training on different tasks. Example embodiments treat different document types (e.g., emails, surveys) as different tasks. This is because language used in emails is usually different from the language used in surveys. Typically, surveys provide straight feedback, whereas emails may contain other content (e.g., a thank you message, salutations) or be overly kind. For example, "the customer is <happy> about < the agent> because < the customer thanked the agent>" in an email is not helpful as an analyzed output. Thus, the training component 206 treats the two different document types as two different tasks when training the generative model. This can be done, for example, by introducing different prefixes in the training data set that gives a gist of what the task is about (e.g., email task, survey task).

To make training (and the generative model) more robust to perturbations, some embodiments make use of a data augmentation in natural language programming (NLPAug) library to randomly augment the input text. Ideally, by training the generative model on similar documents that are differently phrased but mean the same thing, the generative model learns to predict the same output with minor perturbations in the input documents. Perturbations include contextual substitutions, contextual insertions, replacing words with synonyms, and introducing spelling mistakes. Any of these perturbations can happen on a per token basis.

In order to place a stronger emphasis that the generative model should learn to predict the sentiment, target, and reason rather than fillers words (e.g., "the customer is"), the training component 206 randomly chooses to ignore (e.g., drop out) loss of tokens that do not belong to the sentiment or target. Other tokens that are part of the template (e.g., "the," "customer," and "about") are ignored with a certain probability so that it is not lost.

The evaluation system 110 is configured to evaluate new customer satisfaction data using the generative model built by the training system 108. In example embodiments, the evaluation component 210 applies the new customer satisfaction data to the generative model to obtained analyzed, sentiment-based outputs, which can be used to provide alerts, reports, or other types of communications or notifications to the owner of the customer survey data. To enable these operations, the evaluation system 110 comprises a communication interface 208, an evaluation component 210, an alert module 212, and a recommendation module 214.

The communication interface 208 is configured to exchange data with other components of the network system 102. For instance, the communication interface 208 receives the new customer satisfaction data and accesses the generative model generated by the training system 108. In some cases, the generative model is stored to a database (not shown) of the network system 102. In some embodiments, the communication interface 208 also provides the alerts or reports to the customer satisfaction data owner (or their representatives and agents), and/or allows access, by the customer satisfaction data owner (or their representatives and agents), to analyzed sentiment-based data derived from the output generated by the generative model.

The evaluation component 210 is configured to apply the new customer satisfaction data to the generative model and obtain the output. The generative model is trained to be geared to a predetermined or predefined template (e.g., the target-based sentiment template) in order to constrain the nature of the generation. While the generative model can generate a plurality of sentences, each sentence follows the format of the template. In one embodiment, the template format is: "The customer is <sentiment> about <target> because <reason>." In example embodiments, the sentiment is one word or token, while the target and reason can be a span of tokens. If the generative model generates something that does not fit the template format, the output is indicated to be neutral in sentiment (e.g., neither happy nor sad). While example embodiments discuss sentiment as being labeled happy or sad, alternative embodiments may utilize other sentiment values (e.g., positive or negative).

Figure 4:
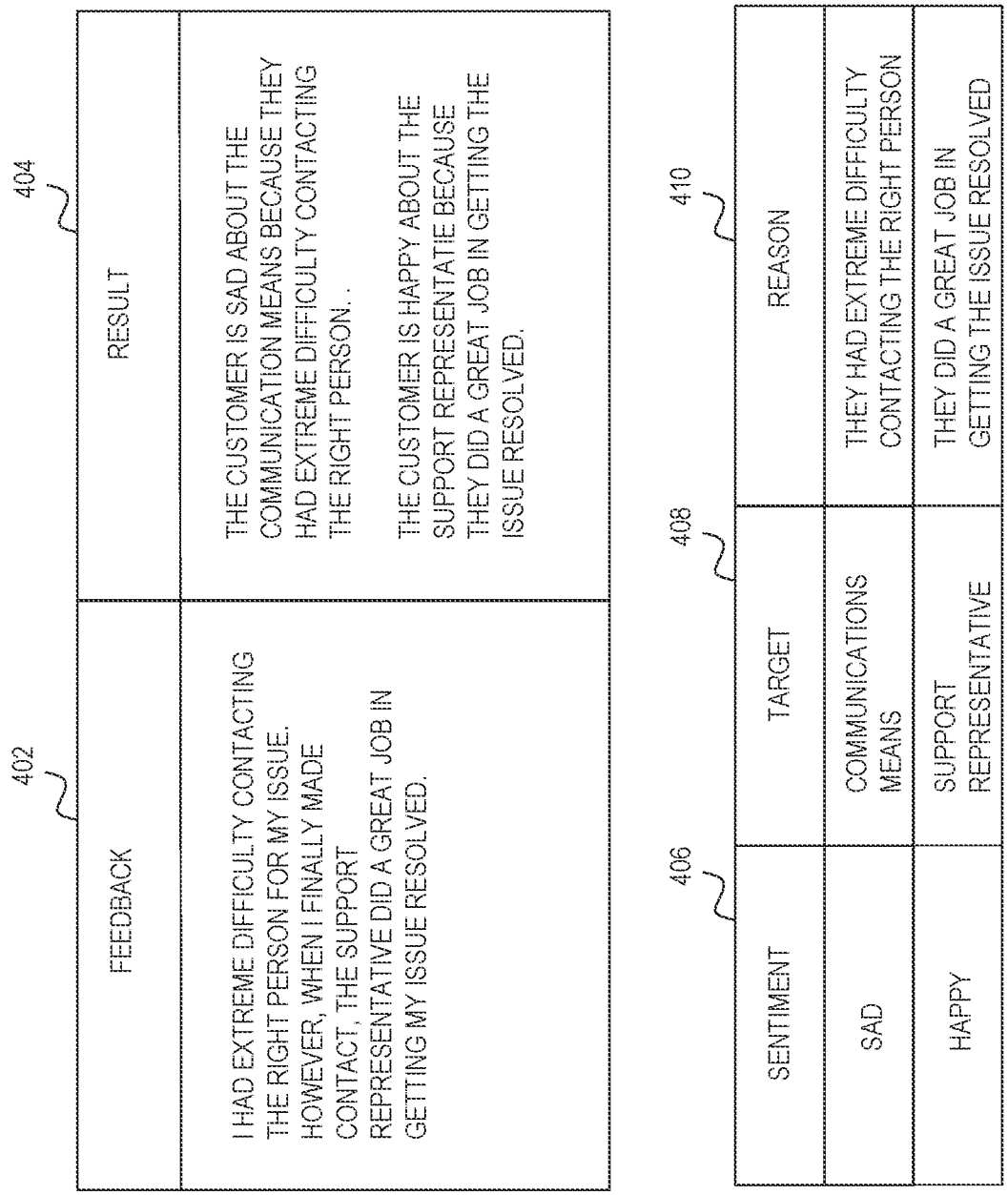
FIG. 4 is a diagram illustrating evaluation of a feedback input, according to one example.

Referring now to FIG. 4, a diagram illustrating evaluation of a feedback input 402 from customer satisfaction data is shown. In this example, the feedback input 402 may have received a five-star rating. Conventional models may simply classify this feedback as positive given its five-star rating. However, the feedback input 402 is not all positive. Specifically, the feedback input 402 indicates that the customer had an extremely difficult time contacting the right person for their issue, but when contact was finally made, the representative did a great job resolving the issue.

The feedback input 402 is applied to the generative model by the evaluation component 210. A result 404 or output of the generative model includes two generated sentences. The first sentence is that "The customer is sad about the communication means because they had extreme difficulty contacting the right person." The second sentence is that "The customer is happy about the support representative because they did a great job in getting the issue resolved." Thus, the two sentences are generated according to the format of the target-based sentiment template.

In some embodiments, the evaluation component 210 identifies (e.g., parses out) a sentiment 406, a target 408, and a reason 410 from each sentence. For instance, the sentiment 406 from the first sentence is "sad," the target 408 is "communications means," and the reason 410 is "they had extreme difficulty contacting the right person. Here, "communication means" is an inferred target that is inferred based on the feedback input referring to "contacting" and "contact." For the second sentence, the sentiment 406 is "happy,"

the target 408 is "support representative," and the reason 410 is "they did a great job in getting the issue resolved."

Referring back to FIG. 2, the alert module 212 is configured to generate and provide alerts or reports to quality leads (e.g., supervisors of customer support agents) or the customer support agents, themselves. In some cases, the alerts or reports can provide analysis of the customer satisfaction data such that the quality leads can take action. The alerts or reports can be provided at predetermined intervals (e.g., every hour), at certain times throughout the day or week, when a certain amount of results has been obtained, or based on other criteria.

Figure 5:
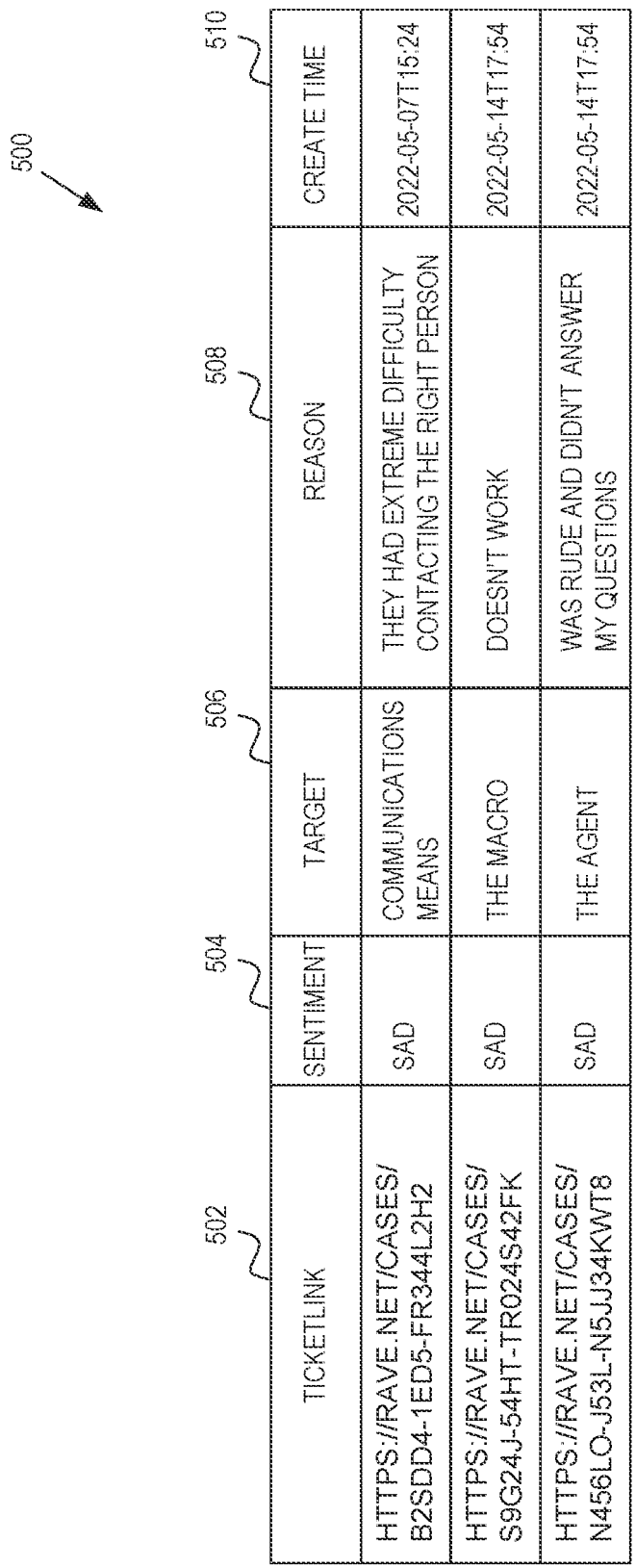
FIG. 5 is a diagram illustrating an alert that is presented based on evaluation of feedback inputs using the target-based sentiment model, according to one example.

In example embodiments, the alert module 212 generates alerts or reports that indicate the sentiment, the target, and the reason for each sentiment and target. FIG. 5 is a diagram that illustrates an example of an alert 500. In this example, the alert 500 includes a link to a support ticket (e.g., ticket link 502) for an issue that produced the corresponding feedback input. The alert 500 also identifies the sentiment 504, the target 506, and the reason 508 for each result. In some cases, the alert 500 can include a time when the ticket was created (e.g., create time 510). Other pertinent information corresponding to each result can also be included in further embodiments. For instance, the alert 500 can include a recommendation on how to address a result with a negative sentiment. While only one sentiment 504, target 506, and reason 508 is presented for each support ticket (e.g., ticket link 502), some embodiments may have multiple results for the same ticket. Additionally, while only a sad sentiment is shown on the alert 500, alternative embodiments may include other sentiments (e.g., happy) and their corresponding target 506 and reason 508.

Referring back to FIG. 2, the recommendation module 214 is configured to generate and provide recommendations to customer support agents (or their quality leads) that are based on the results or output. In one embodiment, the recommendation module 214 or the evaluation component 210 generates a table that indicates, for an example result or output, the sentiment, a word/token contained within various targets or reasons of similar outputs (including the example output), and a recommendation for an action to be performed by the customer support agent for the example output. In some embodiments, the recommendation module 214 uses the table to surface recommendations to the customer support agent based on a result from the generative model. In other embodiments, the table can be viewable and/or searchable by the customer support agents. The following is an example of a table that can be referenced by the customer support agents or with which the recommendation module 214 can reference to determine a recommendation to surface to the customer service agents.

| Example Output | Sentiment Equals | Either Target or Reason Contains | Surfaced Recommendation to Agent |
|---|---|---|---|
| The customer is sad about the issue because it was not resolved. | Sad | problem solution issue resolv* respon* sugges* help instruct* step work | Verify solution with same customer giving feedback. |
| The customer is sad about the time | Sad | contact respon* | Contact customer sooner rather than |

| Example Output | Sentiment Equals | Either Target or Reason Contains | Surfaced Recommendation to Agent |
|---|---|---|---|
| because it took 11 days to fix something that in reality takes about 30 seconds. | | time slow day week month hour delay | later, even if just to check in. |
| The customer is sad about the agent because he promised to call back. | Sad | call* phone voice audio | Remember scheduled callback times. Use alternative methods of communicating if phone calls don't work well. |
| The customer is sad about Company XYZ because they showed their inability to support or sell their product | Sad | Company XYZ Company XYZ | The customer does not have a good impression of the brand. Recommend ways to make the most of their Company XYZ subscription (using a recommendation feature). |

Assume an output of the generative model is that "The customer is sad about the time because he didn't hear back until five days later." Because the target is "time" or the reason contains the word "day," the recommendation module 214 determines (or the customer service agent can reference the above table and determine) that the output is similar to the second example in the table. As such, a recommendation to contact the customer sooner rather than later, even just to check in is identified. While the table is shown with only negative sentiment (e.g., sad), some embodiments may also include positive sentiment (e.g., happy) to give the quality lead and/or customer support agents more information. For example, if "The customer is happy about the agent because he solved the problem in under an hour," then the surfaced recommendation can be to contact the customer sooner rather than later. Further still, positive sentiments can be surfaced to the agent (and/or their quality lead) through messages as a morale booster, especially when a customer specifically leaves positive feedback about a specific agent.

Figure 6:
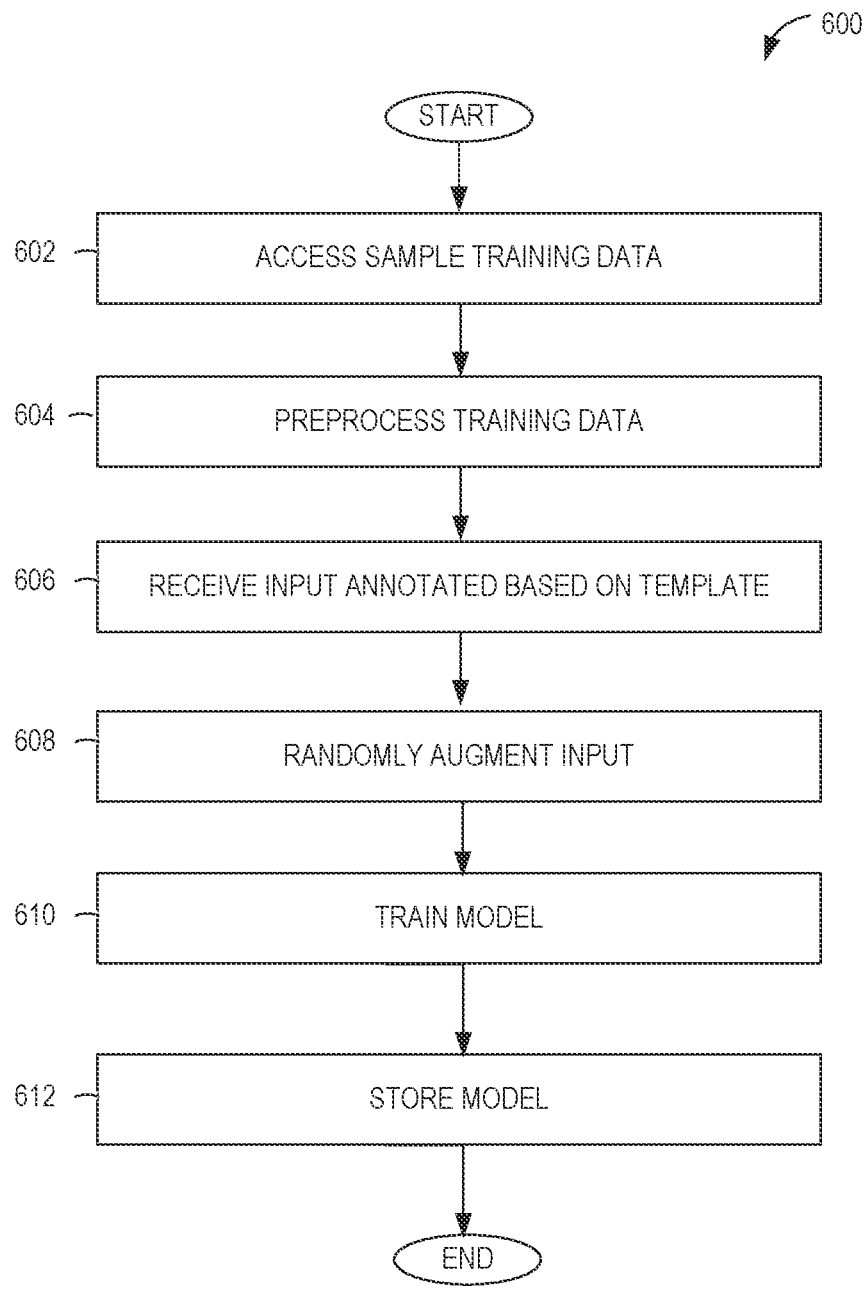
FIG. 6 is a flowchart illustrating operations of a method for building the target-based sentiment model, according to some example embodiments.

FIG. 6 is a flowchart illustrating operations of a method 600 for building the generative model (e.g., the target-based sentiment model), according to some example embodiments. Operations in the method 600 may be performed by the network system 102 in the network environment 100 described above with respect to FIG. 1 and FIG. 2. Accordingly, the method 600 is described by way of example with reference to components in the network system 102 (e.g., the training system 108). However, it shall be appreciated that at least some of the operations of the method 600 may be deployed on various other hardware configurations or be performed by similar components residing elsewhere in the network environment 100. Therefore, the method 600 is not intended to be limited to these components.

In operation 602, the training system 108 accesses sample training data. In example embodiments, the training system 108 may use a small sampling of previous customer satisfaction data as the training data. For example, the sample training data may include 200 surveys, 260 emails sent from customers, and 50 documents with neutral sentiment.

In operation 604, the preprocessing module 202 preprocess the sample training data. In some embodiments, the sample training data may be anonymized by the preprocessing module 202. Additionally or alternatively, the preprocessing module 202 removes special characters and punctuations other than periods.

In operation 606, the annotation module 204 receives annotations of the sample training data (e.g., annotations of each of the sample input data). The annotations may be received from a client device of a human annotator or from a machine that is trained to perform the annotation process. In example embodiments, the annotations and thus, the training, is constrained by a predetermined template (e.g., a target-based sentiment template). In one embodiment, the format of the predetermined template is "The customer is <sentiment> about <target> because <reason>."

In operation 608, the training component 206 randomly augments the sample input data. In example embodiments, a NLPAug library is used to randomly augment the input text so that the generative model is robust to perturbations. As a result, the generative model learns to predict a same output with minor perturbations in the sample inputs. Perturbations include contextual substitutions, contextual insertions, replacing words with synonyms, and introducing spelling mistakes. Any of these perturbations can happen on a per token basis. In some cases, operation 608 may be performed prior to operation 606.

In operation 610, the training component 206 trains the generative model. Specifically, the training component 206 receives training data that includes the sample input data and corresponding annotations for each sample input data. The generative model is then trains using the training data. In example embodiments, the training component 206 uses (e.g., trains) a text-to-text-transfer-transformation (T5) model. The T5 model is used due to its good few shot learning capabilities and because it can be trained for different tasks. Specifically, the T5 model can be trained for both an email task (for analyzing email customer satisfaction data) and a survey task (for analyzing survey customer satisfaction data). The resulting generative model is trained to predict a sentiment, a target, and a reason. In some embodiments, the training component 206 randomly chooses to ignore tokens that do not belong to the sentiment or target. Other tokens that are part of the template (e.g., "the," "customer," and "about") are ignored with a certain probability so that it is not loss.

In operation 612, the generative model is stored (e.g., to a data storage) for later use by the evaluation system 110.

In some embodiments, the generative model can be retrained to improve on its accuracy. For instance, training the generative model with a higher number of sample training data will provide a generative model that can more accurately generate the output sentences. However, because the generative model is generative in natural, the generative model does not need to be retrained in order to identify new targets or reasons.

Figure 7:
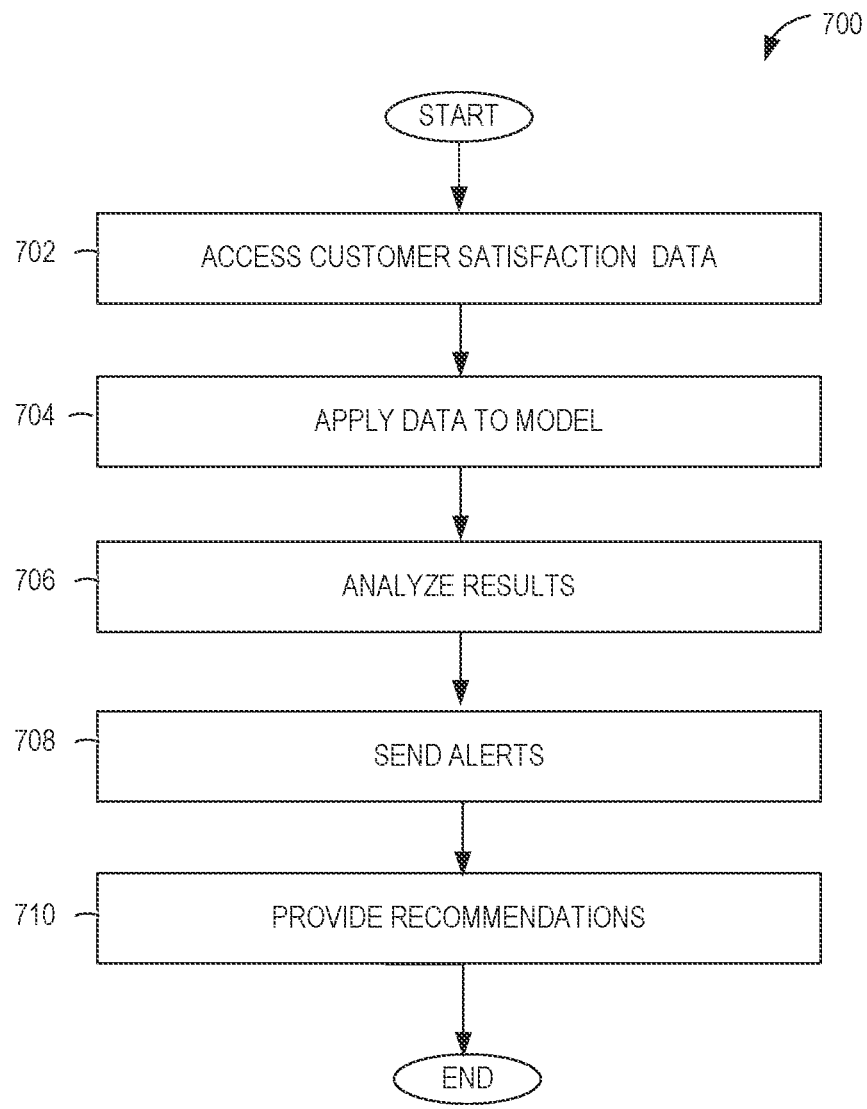
FIG. 7 is a flowchart illustrating operations of a method for evaluating feedback using the target-based sentiment model, according to some example embodiments.

FIG. 7 is a flowchart illustrating operations of a method 700 for evaluating feedback using the generative model (e.g., the target-based sentiment model), according to some example embodiments. Operations in the method 700 may be performed by the network system 102 in the network environment 100 described above with respect to FIG. 1 and FIG. 2. Accordingly, the method 700 is described by way of example with reference to components in the network system 102 (e.g., the evaluation system 110). However, it shall be appreciated that at least some of the operations of the method 700 may be deployed on various other hardware configurations or be performed by similar components residing elsewhere in the network environment 100. Therefore, the method 700 is not intended to be limited to these components.

In operation 702, the communication interface 208 accesses customer satisfaction data. In some embodiments, the communication interface 208 receives or retrieves the new customer satisfaction data. For instance, the customer satisfaction data may be stored to a data store as it is received and evaluated in batches at certain times (e.g., every night, every hour), when a certain amount of customer satisfaction data is received (e.g., when there are 200 emails or 200 surveys), when an evaluation process is manually triggered, or based on other criteria.

In operation 704, the evaluation component 210 applies the customer satisfaction data to the generative model. In example embodiments, the generative model generates a plurality of sentences based on the feedback inputs from the customer satisfaction data, whereby each sentence (also referred to as "output") follows the format of a predetermined template (e.g., the target-based sentiment template) in order to constrain the nature of the generation. In one embodiment, the template format is: "The customer is <sentiment> about <target> because <reason>." If the generative model generates something that does not fit the template format, the output is deemed to be neutral (e.g., neither happy nor sad).

Because the generative model is generative and adaptive, it can receive feedback inputs with targets and/or reasons that it has never seen during training, and the generative model can generate an output. Furthermore, a same feedback input can have multiple targets and sentiments. Further still, a same feedback input may have different sentiments for a same target (e.g., happy that the customer service agent called back right away, but sad that customer service agent was rude).

In operation 706, the evaluation component 210 analyzes the results. In some embodiments, the evaluation component 210 identifies a sentiment, a target, and a reason from each generated sentence. The analyzed results (e.g., sentiment, target, reason) may be organized (e.g., into a table) and stored (e.g., in a data store).

In operation 708, the alert module 212 generates and sends alerts or reports that indicate the sentiment, the target, and the reason for each sentiment and target. In some cases, the table generated by the evaluation component 210 can be sent to a quality lead or customer satisfaction data owner. In other embodiments, the alerts module 202 generates an alert or report that indicates, for example, a ticket linked to each sentence output and the corresponding sentiment, target, and reason. The alert can include other information such as a time the ticket was created or a customer support agent that worked on the ticket.

In operation 710, the recommendation module 214 generates and provides recommendations to customer support agents that is based on the outputs. In one embodiment, the recommendation module 214 generates a table (or uses the table generated by the evaluation component 210) that indicates, for a particular result or output, a sentiment, word/token contained within the target or reason, and a recommendation for an action to be performed by the customer support agent. In some embodiments, the recommendation module 214 uses the table to automatically (without human intervention) surface recommendations to the customer support agent based on an output from the generative model. In other embodiments, the table can be viewable by customer support agents to find a recommended action to perform.

In some embodiments, operation 708 and/or operation 710 are optional. For example, instead of receiving alerts or recommendations, a customer satisfaction data owner can access the analyzed results directly from the network system 102.

Figure 8:
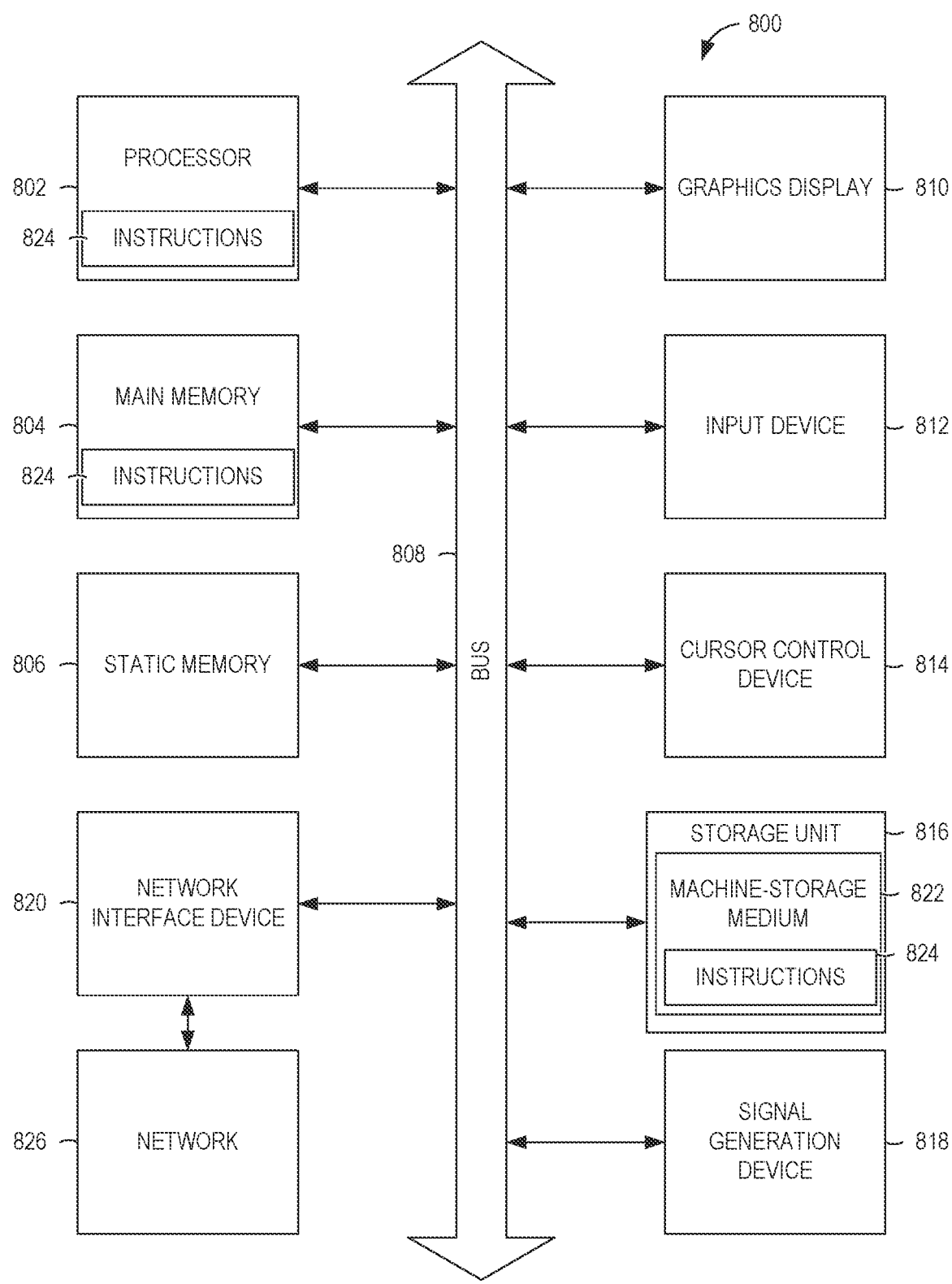
FIG. 8 is a block diagram illustrating components of a machine, according to some example embodiments, able to read instructions from a machine-storage medium and perform any one or more of the methodologies discussed herein.

FIG. 8 illustrates components of a machine 800, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIG. 6 and FIG. 7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-storage media (e.g., tangible and non-transitory machine-storage media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for training and utilizing a generative language model that is constrained by a predetermined template. The method comprises accessing, by a communication interface of a network system, customer data that includes a plurality of feedback input; transmitting the customer data to an evaluation component of the network system; generating, by a generative model associated with the evaluation component, one or more sentences based on a feedback input of the plurality of feedback inputs, the one or more sentences each including a sentiment, a target, and a reason for the sentiment in a format defined by a predetermined template used to train the generative model; identifying, by the evaluation component, the sentiment, the target, and the reason from a sentence of the one or more sentences generated by the generative model; and causing presentation, on a device of a user, of a communication based on at least the sentiment and the reason identified from the sentence.

In example 2, the subject matter of example 1 can optionally include wherein the format of the predetermined template is "The customer is <sentiment> about <target> because <reason>."

In example 3, the subject matter of any of examples 1-2 can optionally include generating an alert that indicates a link to a ticket associated with the sentence, the sentiment, the target, and the reason; and transmitting the alert to the device of the user, wherein the causing presentation of the communication comprises causing presentation of the alert.

In example 4, the subject matter of any of examples 1-3 can optionally include based on the sentiment and the reason, identifying a recommendation of an action; and transmitting the recommendation to the device of the user, wherein the causing presentation of the communication comprises causing presentation of the recommendation.

In example 5, the subject matter of any of examples 1-4 can optionally include generating a table that indicates a plurality of example outputs from the generative model, a sentiment associated with each example output, a plurality of tokens contained within targets or reasons associated with each example output and corresponding similar outputs, and a recommendation to surface to the device of the user based on each example output; selecting a recommendation from the table based on the sentiment and a token in the reason from the sentence matching the sentiment and a token of the plurality of tokens for an example output in the table; and transmitting the recommendation to the device of the user, wherein the causing presentation of the communications comprises causing presentation of the recommendation.

In example 6, the subject matter of any of examples 1-5 can optionally include training the generative model, the training the generative model comprising accessing annotated training data that is training data annotated in the format defined by the predetermined template; providing a training component with the training data and the corresponding annotated training data; and training, by the training component, the generative model to identify similar text patterns and to generate output sentences in the format defined by the predetermined template.

In example 7, the subject matter of any of examples 1-6 can optionally include wherein the training the generative model comprises training a text-to-text-transfer-transformation (T5) model.

In example 8, the subject matter of any of examples 1-7 can optionally include wherein the training the generative model comprises performing multi-task training for an email task and a survey task.

In example 9, the subject matter of any of examples 1-8 can optionally include wherein the training the generative model further comprises randomly augmenting the training data or the annotated training data prior to training the generative model.

In example 10, the subject matter of any of examples 1-9 can optionally include wherein the augmentation comprises one or more of a contextual substitution, a contextual insertion, replacing a word with a synonym, or introducing a spelling mistake.

In example 11, the subject matter of any of examples 1-10 can optionally include wherein the training the generative model comprises randomly choosing to ignore loss of tokens that do not belong to the sentiment or the target Example 12 is a system for training and utilizing a generative language model that is constrained by a predetermined template. The system comprises one or more hardware processors and a memory storing instructions that, when executed by the one or more hardware processors, cause the one or more hardware processors to perform operations comprising accessing, by a communication interface of a network system, customer data that includes a plurality of feedback input; transmitting the customer data to an evaluation component of the network system; generating, by a generative model associated with the evaluation component, one or more sentences based on a feedback input of the plurality of feedback inputs, the one or more sentences each including a sentiment, a target, and a reason for the sentiment in a format defined by a predetermined template used to train the generative model; identifying, by the evaluation component, the sentiment, the target, and the reason from a sentence of the one or more sentences generated by the generative model; and causing presentation, on a device of a user, of a communication based on at least the sentiment and the reason identified from the sentence.

In example 13, the subject matter of example 12 can optionally include wherein the format of the predetermined template is "The customer is <sentiment> about <target> because <reason>."

In example 14, the subject matter of any of examples 12-13 can optionally include wherein the operations further comprise generating an alert that indicates a link to a ticket associated with the sentence, the sentiment, the target, and the reason; and transmitting the alert to the device of the user, wherein the causing presentation of the communication comprises causing presentation of the alert.

In example 15, the subject matter of any of examples 12-14 can optionally include wherein the operations further comprise based on the sentiment and the reason, identifying a recommendation of an action; and transmitting the recommendation to the device of the user, wherein the causing presentation of the communication comprises causing presentation of the recommendation.

In example 16, the subject matter of any of examples 12-15 can optionally include wherein the operations further comprise training the generative model, the training the generative model comprising accessing annotated training data that is training data annotated in the format defined by the predetermined template; providing a training component with the training data and the corresponding annotated training data; and training, by the training component, the generative model to identify similar text patterns and to generate output sentences in the format defined by the predetermined template.

In example 17, the subject matter of any of examples 12-16 can optionally include wherein the training the generative model comprises performing multi-task training for an email task and a survey task.

In example 18, the subject matter of any of examples 12-17 can optionally include wherein the training the generative model further comprises randomly augmenting the training data or the annotated training data prior to training the generative model.

In example 19, the subject matter of any of examples 12-18 can optionally include wherein the training the generative model comprises randomly choosing to ignore loss of tokens that do not belong to the sentiment or the target.

Example 20 is a storage medium comprising instructions which, when executed by one or more hardware processors of a machine, cause the machine to perform operations for training and utilizing a generative language model that is constrained by a predetermined template. The operations comprise accessing, by a communication interface of a network system, customer data that includes a plurality of feedback input; transmitting the customer data to an evaluation component of the network system; generating, by a generative model associated with the evaluation component, one or more sentences based on a feedback input of the plurality of feedback inputs, the one or more sentences each including a sentiment, a target, and a reason for the sentiment in a format defined by a predetermined template used to train the generative model; identifying, by the evaluation component, the sentiment, the target, and the reason from a sentence of the one or more sentences generated by the generative model; and causing presentation, on a device of a user, of a communication based on at least the sentiment and the reason identified from the sentence.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   training a generative language model to identify features that it was not explicitly trained with, the training the generative language model comprising:

accessing training data and annotated training data, the annotated training data comprising annotations of the training data constrained by a predetermined template to be in a specific format; and training, by a training component, the generative language model to perform natural language generation tasks that include generating one or more sentences comprising a sentiment, a target, and a reason for the sentiment in a format defined by the predetermined template without having been trained on the target or reason;

accessing, by a communication interface of a network system, customer data that includes a plurality of feedback input;

transmitting the customer data to an evaluation component of the network system;

generating, by the generative language model associated with the evaluation component, the one or more sentences based on a feedback input of the plurality of feedback inputs, the one or more sentences each including the sentiment, the target, and the reason for the sentiment in the format defined by the predetermined template used to train the generative language model;

identifying, by the evaluation component, the sentiment, the target, and the reason from a sentence of the one or more sentences generated by the generative language model; and automatically, without human intervention, surfacing, by a recommendation module, a recommendation for an action to be performed by a user based on the sentiment and the reason and on a table that indicates a plurality of outputs from the generative language model, a sentiment associated with each output, one or more tokens associated with a target or reason associated with each output, and a recommendation for an action to be performed for each output.

2. The method of claim 1, wherein the format of the predetermined template is "The customer is <sentiment> about <target> because <reason>".

3. The method of claim 1, further comprising:
generating an alert that indicates a link to a ticket associated with the sentence, the sentiment, the target, and the reason; and
transmitting the alert to a device of the user.

4. The method of claim 1, wherein the automatically surfacing the recommendation comprises transmitting the recommendation to a device of the user.

5. The method of claim 1, further comprising:
generating the table that indicates the plurality of outputs from the generative model, the sentiment associated with each output, the one or more tokens associated with the target or reason associated with each output, and the recommendation to surface to a device of the user based on each output.

6. The method of claim 1, wherein the training the generative language model comprises training a text-to-text-transfer-transformation (T5) model.

7. The method of claim 1, wherein the training the generative language model comprises performing multi-task training for an email task and a survey task.

8. The method of claim 1, wherein the training the generative language model further comprises randomly augmenting the training data or the annotated training data using a natural language processing (NPL) augmentation library.

9. The method of claim 8, wherein the randomly augmenting comprises one or more of a contextual substitution, a contextual insertion, replacing a word with a synonym, or introducing a spelling mistake.

10. The method of claim 1, wherein the training the generative language model comprises randomly choosing to ignore loss of tokens that do not belong to the sentiment or the target.

11. A system comprising:
one or more hardware processors; and
a memory storing instructions that, when executed by the one or more hardware processors, cause the one or more hardware processors to perform operations comprising:
training a generative language model to identify features that it was not explicitly trained with, the training the generative language model comprising:
accessing training data and annotated training data, the annotated training data comprising annotations of the training data constrained by a predetermined template to be in a specific format; and
training, by a training component, the generative language model to perform natural language generation tasks that include generating one or more sentences comprising a sentiment, a target, and a reason for the sentiment in a format defined by the predetermined template without having been trained on the target or reason;
accessing, by a communication interface of a network system, customer data that includes a plurality of feedback input;
transmitting the customer data to an evaluation component of the network system;
generating, by the generative language model associated with the evaluation component, the one or more sentences based on a feedback input of the plurality of feedback inputs, the one or more sentences each including the sentiment, the target, and the reason for the sentiment in the format defined by the predetermined template used to train the generative language model;
identifying, by the evaluation component, the sentiment, the target, and the reason from a sentence of the one or more sentences generated by the generative language model; and
automatically, without human intervention, surfacing, by a recommendation module, a recommendation for an action to be performed by a user based on the sentiment and the reason and on a table that indicates a plurality of outputs from the generative language model, a sentiment associated with each output, one or more tokens associated with a target or reason associated with each output, and a recommendation for an action to be performed for each output.

12. The system of claim 11, wherein the format of the predetermined template is "<sentiment> about <target> because <reason>".

13. The system of claim 11, wherein the operations further comprise:
generating an alert that indicates a link to a ticket associated with the sentence, the sentiment, the target, and the reason; and
transmitting the alert to a device of the user.

14. The system of claim 11, wherein the automatically surfacing the recommendation comprises
transmitting the recommendation to a device of the user.

15. He system of claim 11, wherein the training the generative language model comprises performing multi-task training for an email task and a survey task.

16. The system of claim 11, wherein the training the generative language model further comprises randomly augmenting the training data or the annotated training data prior to training the generative language model.

17. The system of claim 11, wherein the training the generative language model comprises randomly choosing to ignore loss of tokens that do not belong to the sentiment or the target.

18. A machine-storage medium comprising instructions which, when executed by one or more hardware processors of a machine, cause the machine to perform operations comprising:

training a generative language model to identify features that it was not explicitly trained with, the training the generative language model comprising:

accessing training data and annotated training data, the annotated training data comprising annotations of the training data constrained by a predetermined template to be in a specific format; and training, by a training component, the generative language model to perform natural language generation tasks that include generating one or more sentences comprising a sentiment, a target, and a reason for the sentiment in a format defined by the predetermined template without having been trained on the target or reason;

accessing, by a communication interface of a network system, customer data that includes a plurality of feedback input;

transmitting the customer data to an evaluation component of the network system;

generating, by the generative language model associated with the evaluation component, the one or more sentences based on a feedback input of the plurality of feedback inputs, the one or more sentences each including the sentiment, the target, and the reason for the sentiment in the format defined by the predetermined template used to train the generative language model;

identifying, by the evaluation component, the sentiment, the target, and the reason from a sentence of the one or more sentences generated by the generative language model; and automatically, without human intervention, surfacing, by a recommendation module, a recommendation for an action to be performed by a user based on the sentiment and the reason and on a table that indicates a plurality of outputs from the generative language model, a sentiment associated with each output, one or more tokens associated with a target or reason associated with each output, and a recommendation for an action to be performed for each output.

\* \* \* \* \*